United States Patent
Piirainen

(10) Patent No.: US 7,012,973 B1
(45) Date of Patent: Mar. 14, 2006

(54) ESTIMATION OF DOPPLER SHIFT COMPENSATION IN A MOBILE COMMUNICATION SYSTEM

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/936,540

(22) PCT Filed: Mar. 10, 1999

(86) PCT No.: PCT/EP99/01618

§ 371 (c)(1),
(2), (4) Date: Jan. 16, 2002

(87) PCT Pub. No.: WO00/54431

PCT Pub. Date: Sep. 14, 2000

(51) Int. Cl.
*H04L 27/06* (2006.01)

(52) U.S. Cl. ...................... 375/340; 375/346
(58) Field of Classification Search ............... 375/144, 375/145, 148, 149, 340, 341, 346, 347; 370/491
See application file for complete search history.

(56) References Cited

U.S. PATENT DOCUMENTS

| | | | | |
|---|---|---|---|---|
| 5,488,635 A | * | 1/1996 | Chennakeshu et al. | ..... 375/340 |
| 5,867,538 A | * | 2/1999 | Liu | ............................ 375/341 |

FOREIGN PATENT DOCUMENTS

| | | |
|---|---|---|
| EP | 0534399 A2 | 3/1993 |
| EP | 0731587 A2 | 9/1996 |
| WO | WO98/34357 | 8/1998 |

* cited by examiner

*Primary Examiner*—Don N. Vo
(74) *Attorney, Agent, or Firm*—Lackenbach Siegel, LLP

(57) ABSTRACT

A system and method for estimating Doppler shift compensation in a mobile communication system is described. A channel impulse response determination circuit determines a channel impulse response for the channel on which the signal is received. A reference vector is generated using a set of known symbols and the channel impulse response, and an error vector is then generated by comparing the reference vector with received samples of the signal. In addition, the noise variance of the incoming signal can be determined. Then, a Doppler correction factor is estimated having a real part representing amplitude correction and an imaginary part representing phase correction.

11 Claims, 2 Drawing Sheets

ESTIMATION OF DOPPLER SHIFT COMPENSATION IN A MOBILE COMMUNICATION SYSTEM

BACKGROUND OF THE INVENTION

The present invention relates to estimating a Doppler shift compensation in a mobile communication system.

In a mobile communication system, signals which are transmitted from mobile stations moving relative to a base station are subject to the well-known Doppler effect, which causes a frequency shift in the frequency received at the base station relative to that which was transmitted by the mobile station. This frequency shift is referred to herein as the Doppler shift. The Doppler shift is dependent upon the speed and direction of movement of the mobile station relative to the base station. Thus, the Doppler effect can provide an increase or a decrease in the frequency, depending on the direction of movement of the mobile station relative to the base station. The magnitude of the Doppler shift is dependent on the speed with which the mobile station is moving relative to the base station.

Another area of frequency offsets arises when the transmitter unit and the receiver unit are wrongly synchronised.

Existing mobile communication installations provide a form of Doppler compensation, in that the frequency detection circuitry within the base station which selects a particular signal on a particular channel can take into account a certain amount of Doppler shift in the signal.

AU 664626 relates to a method and circuit arrangement for compensating for the Doppler shift in a radio signal propagating between a base station and a mobile station when the mobile station approaches and moves past the base station. As a mobile station approaches the base station with a decreasing propagating time delay, the propagating time delay is integrated at intervals to determine how the propagating time delay varies with time. This information is used to effect a change in the radio signal frequency at a particular time to compensate for the sudden Doppler shift as the mobile station moves past the base station. In a TDMA system, the interrogation occurs at intervals equal to an integral number of time frames. In the GSM standard a time frame comprises eight consecutive time slots and a single transmission burst passes between a particular mobile station and base station in any one time frame.

Thus, in this method of Doppler compensation decisions are made in response to past and incoming signals to improve the reception at a future time, i.e. it is a reactive system. It would be desirable to implement a system which can actively compensate for Doppler shifts in an incoming signal in real time.

Moreover, due to fading a signal subject to the Doppler effect may have a variation in amplitude as well as frequency. It would be desirable to estimate the Doppler effect on amplitude as well as frequency.

BRIEF SUMMARY OF THE INVENTION

According to one aspect of the invention there is provided a system for generating a Doppler correction factor for compensating for Doppler shift in a signal transmitted between a mobile station and a base station in a mobile communication system, the system comprising: a channel impulse response determination circuit for determining a channel impulse response for the channel on which the signal is received; reference circuitry for generating a reference vector from a set of known symbols and the channel impulse response; means for generating an error vector from the reference vector and received samples of the signal; means for determining noise variance of the incoming signal; and an estimator for generating a Doppler correction factor having a real part representing amplitude correction and an imaginary part representing phase correction, the estimator utilising the noise variance, the error vector, the samples of the received signal and the sampling times.

According to the GSM standard, a TDMA transmission burst comprises a training sequence which is normally used to determine the channel impulse response for the channel on which the signal is received. This is done by a convolution of the received training sequence with a stored version of the training sequence. Thus, the training sequence can constitute the set of known symbols for use in generating the reference vector. Alternatively, the set of known symbols can comprise estimated symbols from the received signal samples.

In a TDMA system, the signal comprises a sequence of transmission bursts in respective time slots. The Doppler correction factor can be generated for each transmission burst and used to correct signal samples in that burst.

In addition for correcting for the Doppler effect, the Doppler correction factor also corrects for frequency offsets arising from wrong frequency synchronisation between transmitter and receiver units.

According to a further aspect of the present invention there is provided a method for compensating said Doppler shift in a signal transmitted between a mobile station and a base station in a mobile communication system, the method comprising: determining a channel impulse response for the channel on which the signal is received; generating a reference vector from a set of known symbols in the channel impulse response; generating an error vector from the reference vector and received samples of the signals; determining noise variance of the incoming signals; estimating a Doppler correction factor having a real part representing amplitude correction and an imaginary part representing phase correction, the estimating step using the noise variance, the error vector, the samples of the received signals and the sampling times; and applying the Doppler correction factor to the received signal samples thereby to compensate for Doppler shift.

For a better understanding of the present invention and to show how the same may be carried into effect, reference will now be made by way of example to the accompanying drawings in which:

DETAILED DESCRIPTION OF THE DRAWINGS

Figure 1:
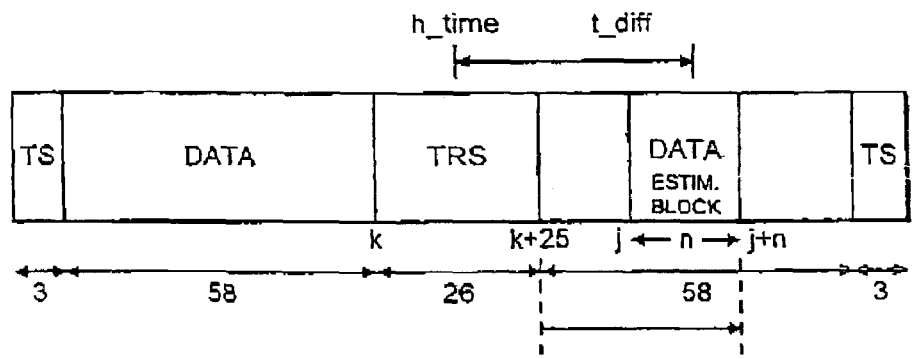
FIG. 1 is a diagram of a signal burst in a mobile communication system.

FIG. 1 illustrates a normal burst in a mobile communication system according to the GSM standard. This figure represents a burst received at a base station. For a TDMA system according to the GSM standard, mobile stations transmit bursts as modulated signals on frequency channels allocated by a base station controller. One frequency channel may support up to eight bursts, each burst associated with a respective call, where each call is allocated a time slot in which to send the burst. Further details of a TDMA system according to the GSM standard are not described herein because they are known to a person skilled in the art.

The normal burst contains two packets of 58 bits (DATA) surrounding a training sequence (TRS) of 26 bits. Three tail bits (TS) are added at each end of the normal burst. The training sequence (TRS) is a predetermined sequence of bits which is sent by the mobile station (MS) and is known at the base station controller (BSC). In FIG. 1, it is assumed that a received signal sample $y_k$ represents the $k_{th}$ bit of the burst, in this instance the start of the training sequence. The training sequence is utilised at the base station controller to estimate the impulse response of the channel over which the burst is sent, and, at least in one embodiment of the invention to estimate a Doppler compensation factor. The actual information which is transmitted is located in the data bits (DATA) of the burst.

As explained earlier, the environment through which a signal passes from a mobile station to a base station can vary considerably, depending, amongst other things, on the distance between the mobile station and the base station, and interference caused by buildings and other structures in the area. As a result, the signal strength and signal quality of the signal received at the base station varies widely. Moreover, for moving mobile stations, the signal received by the base station is subject to a Doppler shift which should be corrected.

Figure 2:
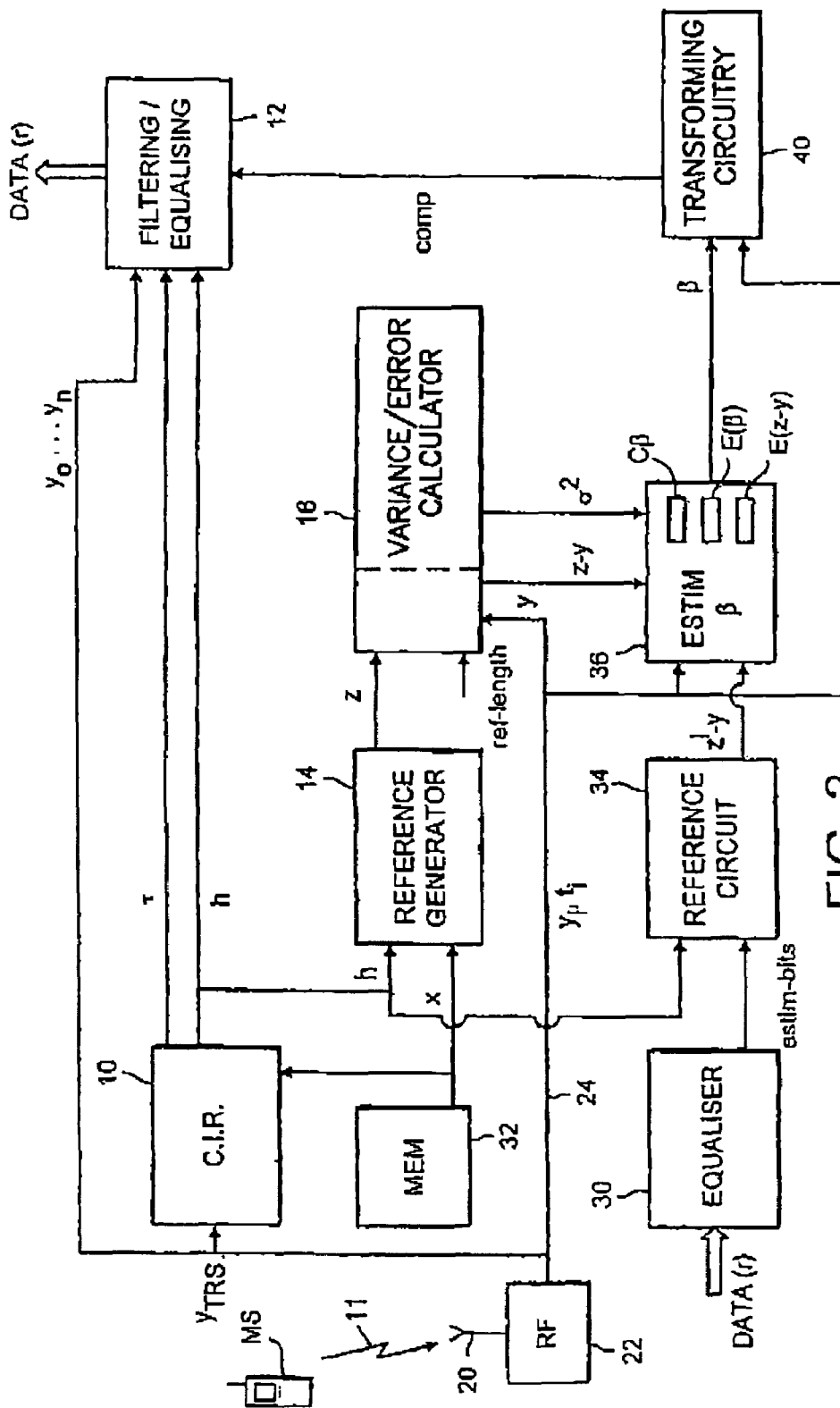
FIG. 2 is a block diagram of circuitry for implementing Doppler shift compensation.

FIG. 2 illustrates a circuit 1 suitable for implementing a Doppler compensation in a GSM system. It should be understood that the various blocks in FIG. 2, although illustrated as separate interconnected entities, do not necessarily represent separate physical entities, but are intended to represent diagrammatically the various steps which are carried out. The blocks could be implemented as circuits or a suitably programmed microprocessor may effect each of the functions which is individually assigned to the blocks.

An antenna 20 receives signals 11 from the mobile stations MS. The antenna 20 is connected to RF circuitry 22. This circuitry 22 operates on the received burst to downshift the frequency to the baseband frequency and to sample the burst to provide from the analogue signal digital sampled values $y_i$ where i is the sample index. The RF circuitry 22 outputs the sampled values $y_0 \ldots y_n$ for each burst together with the sampling times $t_0 \ldots t_n$, typically at the expected bit rate of the transmitted signal. The output of RF circuitry 22 is supplied along line 24 to a channel impulse response (C.I.R.) block 10, to a variance and error calculator 16 to filtering and equalisation circuitry 12, to an Estim β block 36 for estimating a Doppler correction factor and to transforming circuitry 40 to enable the application of the Doppler correction factor to the burst.

A memory 32 holds the training sequence x which is the predetermined sequence of bits which is sent by the mobile station MS as a training sequence and received at the base station and converted into samples $y_{TRS}=Y_k \rightarrow y_{k+25}$. The reference training sequence x is supplied to a reference generator 14 and to the channel impulse response (C.I.R.) block 10. The reference generator 14 also receives the estimated channel impulse response h from the channel impulse response block 10.

The C.I.R. block 10 receives the burst, including the received training sequence $y_{TRS}$ and calculates an estimated channel impulse response h for example by calculating the cross correlation between the received training sequence $y_{TRS}$ and the known training sequence x according to equation 1. There are other types of estimation methods which could be used.

$$h = xcorr(x, y_{TRS}) \qquad \text{(equation 1)}$$

It will be appreciated that, prior to effecting the cross correlation, the known training sequence x, which is stored in digital form, is i,q modulated similarly to the manner in which the training sequence has been modulated at the MS for transmission, according to the GSM standard. The cross correlation is done in a known manner to produce a channel impulse response in the form of five tap values $(h(j)_{j=0 to 4})$.

As is known, the estimated impulse response h is used to calculate the expected estimate of the data in the received burst, as though the data has been subject to the same average noise.

The C.I.R. block also generates timing advance information τ, which is used to determine where in the allocated time slot the received burst is located.

For each burst, the estimated channel impulse response h for that burst is calculated by the CIR block 10 and is supplied to filtering/equalising circuitry which allows the data, DATA(r), in that burst to be recovered. As is known, the filtering/equalising circuit 12 receives the channel impulse response h and timing information τ for the received burst to allow the signal to be demodulated, filtered and decoded, to recover the data in a known manner.

The reference generator 14 produces a reference vector, z, which is calculated using the convolution of the impulse response and the known training sequence. The reference generator 14 performs the following calculation:

$$z = h*x \qquad \text{(equation 2)}$$

where x represents the known symbol values depending o the used modulation.

$z_k$ represents the kth sample of the vector z and z denotes a diagonal matrix of the vector samples $z_k$, that is, z=xh, where x is the diagonal matrix of the known training sequence symbols.

The reference vector z is supplied from the reference generator to the variance and error calculator 16. As described above, the variance calculator also receives the samples $y_i$, including the received training sequence $y_{TRS}$. The variance calculator calculates a variance var ($\sigma^2$) according to the following equation:

$$var = \frac{\left(\sum_{i=4}^{25}(|y_i - z_i|^2)\right)}{ref\_length} \qquad \text{(equation 4)}$$

The term ref_length is a constant representing the length of the reference vector, z. This is calculated by multiplying the number of samples (22) by the bit separation.

In equation 4, the values of $y_i$ are the sampled values of the received training sequence for the burst $(y_k \rightarrow y_{k+25})$.

The variance and error calculator also generates an error vector z-y (i.e. error values $z_i - y_i$ for each sample).

Figure 3:
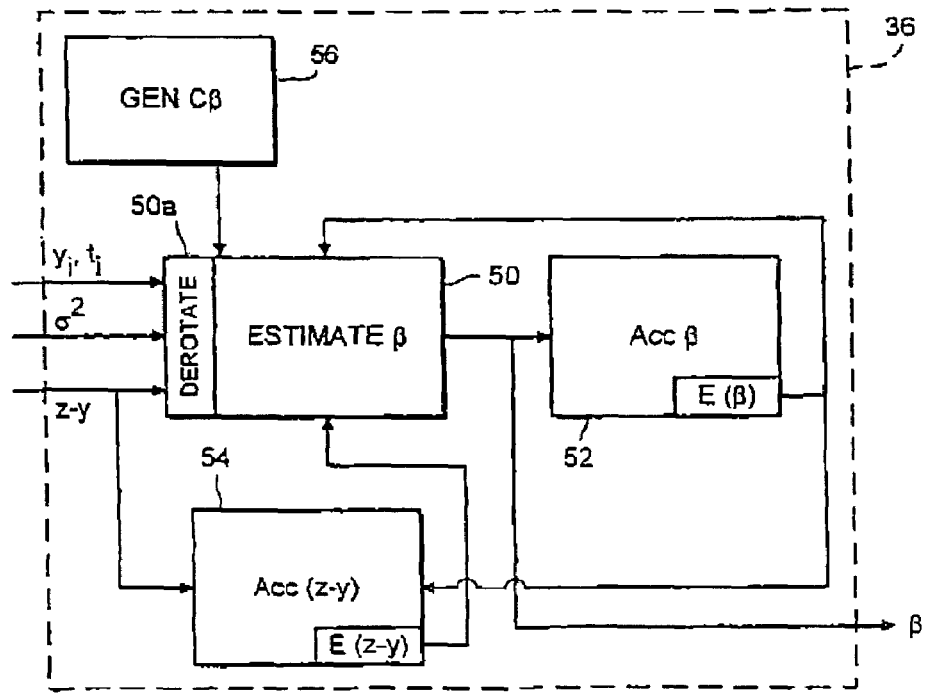
FIG. 3 is a diagram illustrating the Estim $\beta$ block.

The error vector z-y and the variance $\sigma^2$ are supplied to the Estim β block 36. The Estim β block 36 also receives the signal samples and times $y_i, t_i$ from the RF circuitry 22. The Estim β block can be implemented as a processor executing a program or by other suitable means. It operates to generate a Doppler compensation factor β which is a complex number having real and imaginary parts. Thus, β may be represented as:

$$\alpha + j\phi t$$

where α represents amplitude variations due to fading and φ is the Doppler angle. The Estim β block 36 also includes a memory for holding values required to generate the Doppler correction factor β, including $C_β$, E(β) and E(z−y). These terms are explained later with reference to FIG. 3.

The Doppler correction factor β together with the signal samples $y_i$ and times $t_i$ for each burst are supplied to the transforming circuitry 40 to implement Doppler correction according to the following equation:

$$y_{n\text{-}compensated} = y_n(1-\beta t_n).$$

Another implementation of the transforming circuitry 40 is to separate the amplitude and phase components into separate correction steps. The phase can be corrected by multiplying the samples with $e^{-j*imag(\beta)t}{}_n$ and the amplitude can be corrected in a separate step:

$$y_{n\text{-}phase\text{-}compensated} = y_n * e^{-j*imag(\beta)t}{}_n$$

$$y_{n\text{-}compensated} = y_{phase\text{-}compensated}(1-\text{real}(\beta)t_n) \quad \text{(equation 5)}$$

According to the above, imag(β)=φ, and real (β)=α. Thus, the received signal is either amplified or alternated during the burst depending whether real (β) is negative or positive.

This generates a set of compensated signal samples $y_{comp}$ which can be fed to the filtering/equalising circuitry 12 to generate refined values for the data of the burst.

As an alternative to the above, in which the training sequence x is used to supply known symbols as a reference, bits estimated in an equalisation circuit 30 can be used. The equalisation circuit 30, for example of Viterbi equaliser, receives the filtered, demodulated and equalised signal DATA (r) from the filtering and equalisation circuitry 12. The equalisation circuit 30 operates on a part of the data sequence data of the burst (that part having been derived from Estim.block in FIG. 1) to estimate output bits which were sent from the mobile station. This output is referred to herein as estim_bits. The equalisation circuit 30 operates to make decisions of the bits as in known mobile communication systems and thus it will not be described further herein. These estimated bits can be used in place of the training sequence to supply known values for calculating the reference vector z. The estim_bits are supplied to a reference circuit 34 with the channel impulse response h which generates an error vector z′−y, where z′=estim_bits*h.

The theory underlying the generation of the Doppler correction factor β will now be outlined.

The problem of (pure) Doppler frequency estimation can be written as:

Xh=Yr+w, where r is a rotation vector,
Y is a diagonal sample matrix, and
w is noise.

$$Y = \begin{pmatrix} y_0 & 0 & \ldots & 0 \\ 0 & y_1 & \ldots & 0 \\ \ldots & \ldots & \ldots & \ldots \\ 0 & \ldots & \ldots & y_{n-1} \end{pmatrix}, \quad r = \begin{pmatrix} e^{j\phi t_0} \\ e^{j\phi t_1} \\ \\ e^{j\phi t_{n-1}} \end{pmatrix}$$

Xh corresponds to convolution between known symbols (diagonal matrix x of training sequence symbols) and impulse response h.

So, in the Doppler frequency estimation, the Doppler angle φ is to be estimated. This problem is nonlinear and therefore a bit tricky to be solved, particularly for implementation in real time. A linearisation step can be performed assuming $e^{j\phi t}{}_0 \approx 1+j\phi t_0$. Due to fading the required Doppler frequency correction cannot be assumed to be constant in amplitude.

If the term $j\phi t_0$ has also a real component, the amplitude variations can roughly estimated. Thus, the term $j\phi t_0$, is replaced by a more general assumption $1+\beta t_0$, where β is complex (α+jφt).

The linear problem can be written as (for simplification z=Xh=$[z_0 z_1 \ldots z_{n-1}]^T$).

$$z_i = y_i(1+\beta t_i) + w_i,$$

which can be reformatted in matrix notation as $$z - y = p\beta + w \quad \text{(equation 6)}$$

where p=$[y_0 t_0 y_1 t_1 \ldots y_{n-1} t_{n-1}]^T$ and β is to be estimated.

A solution to equation 6 can be found by using an LMMSE estimator $$\beta = E(\beta) + C_{\beta(z-y)} C_{(z-y)(z-y)}^{-1}(z-y-E(z-y))$$

where E (β) is an expected value for β, $C_{\beta(z-y)}$, $C_{(z-y)(z-y)}$ are covariance matrixes between the two elements, viz E(β(z−y)$^H$) and E((z−y)(z−y)$^H$ and E(z−y) is the expected error in the received burst.

In this phase it can be assumed that the noise is white gaussian noise having a variance of $\delta^2$ and after some manipulation $$\beta = E(\beta) + p^H(z-y-E(z-y))/(\delta^2/C_\beta + p^H p), \text{ where} \quad \text{(equation 7)}$$

$$C_\beta = E((\beta-E(\beta))(\beta-E(\beta))^H) \quad \text{(equation 8)}$$

$p^H$ is the complex conjugate transpose matrix of p.

Equation 7 is used in the Estim β block 36 to generate β. The Estim β block is illustrated schematically in FIG. 3. In practice, it can be implemented as software executed by a processor with a memory for holding the required data. An Estimate_β block 50 operates on the data ($Y_i$, $t_i$) received in each time slots to generate a value for β which is used by the transforming circuitry 40. An Acc β block 52 accumulates and averages β values over preceding time slots to generate E(β) The Acc B function can be implemented by an adaptive filter. An Acc (z−y) block 54 generates an expected error E(z−y) To do this, it can use values for z−y from preceding time slots, or E(β) from the Acc β block 52 to estimate a frequency error. A Gen $C_β$ block 56 produces a value for $C_β$. A number of possibilities exist for the parameters of equation 7.

If E(β) is set to zero, and $\delta^2/C_β$ is also set to zero, equation 7 resolves to a normal linear regression.

As mentioned above, it is intended that β will be generated for each time slot. The expected value E(β) can be generated by calculating the average of estimated β values from previous time slots. Thus, these values can be retained as they are calculated for each time slot, and used to produce an average value held in the E(β) block in the Estim β block 36.

Another simplification is to assume that the real part of E(β) is zero. This is a reasonable assumption because, in typical fading channel situations, no long time amplitude is expected. Thus, it is adequate to perform long time averages only in respect of error components of frequency. Also, the real part could be assumed to be zero if only phase variations are to be corrected.

It is possible to avoid having to calculate the expected error E(z−y) by derotating the received samples $y_i$ by $e^{-j*imag(\beta)t}$. For this purpose, $\beta$ can be an earlier estimated value of $\beta$ from a previous time slot. In this case, equation 7 changes to $$\beta=E(\beta)+p^H(z-y)/(\delta^2/C_\beta+p^Hp) \quad \text{(equation 9)}$$

Thus, this requires a preprocessing step (see 50*a* in FIG. 3) in which the sample values $y_i$ are derotated by $e^{-j*imag(\beta)t}$ prior to forming the vector p.

The value for $C(\beta)$ can be generated by the GEN $C_\beta$ block using different approaches. It can be a constant value. I can be estimated using the information of previous time slots, using for example equation 8. It can be made a function of the expected value of $\beta$ and/or the noise variance $\delta^2$. It can be estimated using an adaptive filter, or any combination of the preceding.

The technique is particularly suitable for short delay spread channels and pure frequency errors.

What is claimed is:

1. A system of generating a Doppler correction factor for compensating for Doppler shift in a signal transmitted between a mobile station and a base station in a mobile communication system, the system comprising:
    a channel impulse response determination circuit for determining a channel impulse response for the channel on which the signal is received;
    reference circuitry for generating a reference vector from a set of known symbols and the channel impulse response;
    means for generating an error vector from the reference vector and received samples of the signal;
    means for determining noise variance of the incoming signal; and
    an estimator for generating a Doppler correction factor having a real part representing amplitude correction and an imaginary part representing phase correction, the estimator utilizing the noise variance, the error vector, the samples of the received signal and the sampling times.

2. A system according to claim 1, wherein the Doppler correction factor $\beta$ is generated according to the following equation;

$$\beta=E(\beta)+p^H(z-y-E(z-y))/(\delta^2/C_\beta+p^Hp)$$

wherein $E(\beta)$ is an expected value of $\beta$,
$p^H$ is a complex conjugate transpose matrix of p, where p is the vector $(y_i, t_i)^T$,
z-y is the error vector,
E(z-y) is the expected error in the received samples,
$\delta^2$ is the noise variance, and
$C_\beta$ is a constant.

3. A system according to claim 1, wherein $E(\beta)$ and $\delta^2/C_\beta$ are set to zero.

4. A system according to claims 1, which comprises means for applying a Doppler correction to the received signal samples using the Doppler correction factor $\beta$.

5. A system according to claim 1 wherein the signal comprises a transmission burst in a time slot in a TDMA mobile communication system, and wherein a new Doppler correction factor $\beta$ is generated for each time slot.

6. A system according to claim 5, which comprises means for estimating $E(\beta)$ as an average of generated values for $\beta$ from previous time slots.

7. A system according to claim 5 wherein the real part of $E(\beta)$ is set to be zero.

8. A system according to claim 1, which comprises means for derotating the received signal samples by $e^{-j+imag(F(\beta))t}$, where $E(\beta)$ is an expected value for P the derotated received signal samples then being used to generate the Doppler correction factor $\beta$ in the present time slot according to the following equation:

$$\beta-E(\beta)+p^H(z-y)/(\delta^2/C_\beta+p^Hp).$$

9. A method for compensating said Doppler shift in a signal transmitted between a mobile station and a base station in a mobile communication system, the method comprising:
    determining a channel impulse response for the channel on which the signal is received;
    generating a reference vector from a set of known symbols in the channel impulse response;
    generating an error vector from the reference vector and received samples of the signals;
    determining noise variance of the incoming signals;
    estimating a Doppler correction factor having a real part representing amplitude correction and an imaginary part representing phase correction, the estimating step using the noise variance the vector, the samples of the received signals and the sampling times; and
    applying the Doppler correction factor to the received signal samples thereby to the compensate for Doppler shift.

10. A method to claim 9, wherein the signal comprises a sequence of transmission bursts in a TDMA mobile communication system, and the Doppler correction factor is generated for each transmission burst.

11. A method according to claim 10, wherein the Doppler correction factor $\beta$ is generated according t the following equation:

$$\beta=E(\beta)+p^H(z-y-E(z-y))/(\delta^2/C_\beta+p^Hp)$$

wherein $E(\beta)$ is an expected value of $\beta$,
$p^H$ is a complex conjugate transpose matrix of p, where p is the vector $(y_i, t_i)^T$,
z-y is the error vector,
E(z-y) is the expected error in the received samples,
$\delta^2$ is the noise variance, and
$C_\beta$ is a constant.

* * * * *